(12) United States Patent
Shmunk

(10) Patent No.: US 10,334,192 B2
(45) Date of Patent: Jun. 25, 2019

(54) OPTICAL IMAGING SYSTEMS WITH ALGORITHMIC ABERRATION CORRECTIONS

(71) Applicant: Almalence Inc., Austin, TX (US)

(72) Inventor: Dmitry Shmunk, Novosibirsk (RU)

(73) Assignee: ALMALENCE INC., Austin, TX (US)

( * ) Notice: Subject to any disclaimer, the term of this patent is extended or adjusted under 35 U.S.C. 154(b) by 27 days.

(21) Appl. No.: 14/860,739

(22) Filed: Sep. 22, 2015

(65) Prior Publication Data

US 2018/0267298 A1    Sep. 20, 2018

(51) Int. Cl.
| | | |
|---|---|---|
| *H04N 9/04* | (2006.01) | |
| *H04N 5/357* | (2011.01) | |
| *G02B 15/02* | (2006.01) | |
| *G02B 7/04* | (2006.01) | |
| *H04N 5/232* | (2006.01) | |
| *G02B 7/02* | (2006.01) | |
| *G02B 13/00* | (2006.01) | |
| *G02B 23/20* | (2006.01) | |

(52) U.S. Cl.
CPC .......... *H04N 5/3572* (2013.01); *G02B 7/04* (2013.01); *G02B 15/02* (2013.01); *H04N 9/04517* (2018.08); *G02B 7/021* (2013.01); *G02B 13/001* (2013.01); *G02B 23/20* (2013.01); *H04N 5/23245* (2013.01)

(58) Field of Classification Search
CPC ........ G03B 17/04; G02B 23/20; G02B 15/02; G02B 13/001; G02B 7/021; G02B 7/023; G02B 7/04; G02B 27/0025

USPC ................................................ 396/348-350
See application file for complete search history.

(56) References Cited

U.S. PATENT DOCUMENTS

| | | | | |
|---|---|---|---|---|
| 4,072,970 A * | 2/1978 | Winkler | ............... | G03B 17/04 396/348 |
| 6,031,998 A * | 2/2000 | Shono | ................... | G03B 17/04 348/240.3 |
| 7,785,021 B2 * | 8/2010 | Kato | ..................... | G03B 17/04 359/817 |
| 8,625,024 B2 * | 1/2014 | Hsu | ...................... | G02B 13/009 348/373 |
| 2008/0106811 A1 * | 5/2008 | Eromaki | ............... | G02B 7/102 359/817 |
| 2010/0045855 A1 * | 2/2010 | Tanida | ................. | H04N 5/2252 348/374 |

\* cited by examiner

*Primary Examiner* — Nelson D. Hernández Hernández
(74) *Attorney, Agent, or Firm* — Cantor Colburn LLP

(57) ABSTRACT

Optical imaging systems are presented with high performance physical optics in conjunction with advanced image processing technique specifically tuned with respect to those physical optics to realize compact, very high resolution imaging systems. Clever geometric arrangements of lens elements and translation systems to effect motion between those arrangements support very compact storage modes and high performance imaging modes in the same device. As such, these imaging systems disclosed are particularly useful for photography and videography applications where highly portable and compact platforms are in demand. Systems which are small enough to be integrated with a common smartphone computing platform can produce very high resolution images comparable to those of high end digital single lens reflex DSLR systems.

16 Claims, 14 Drawing Sheets

Figure 3:
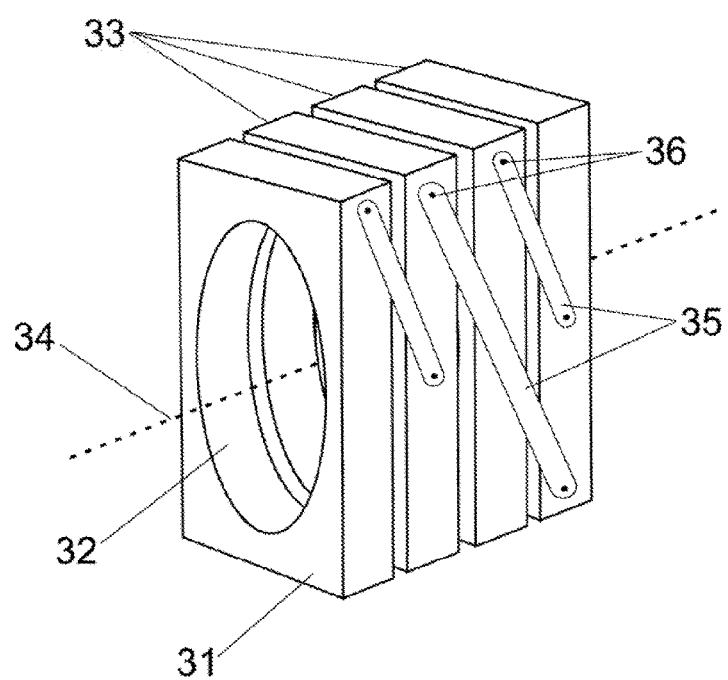

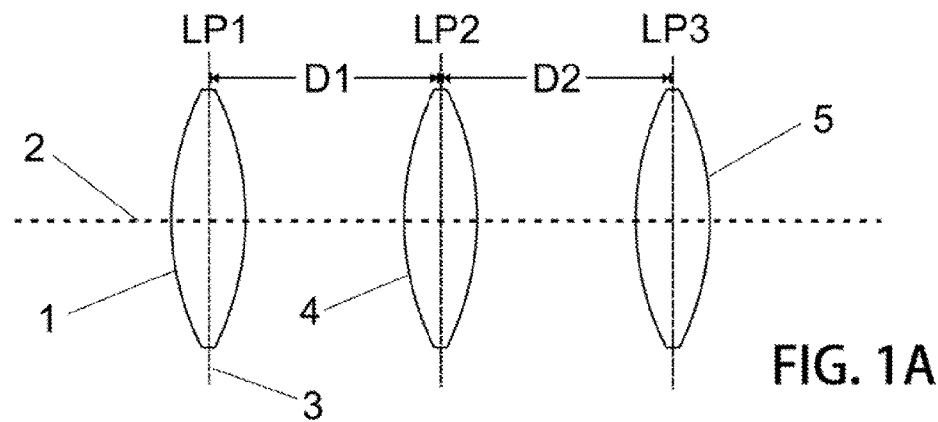
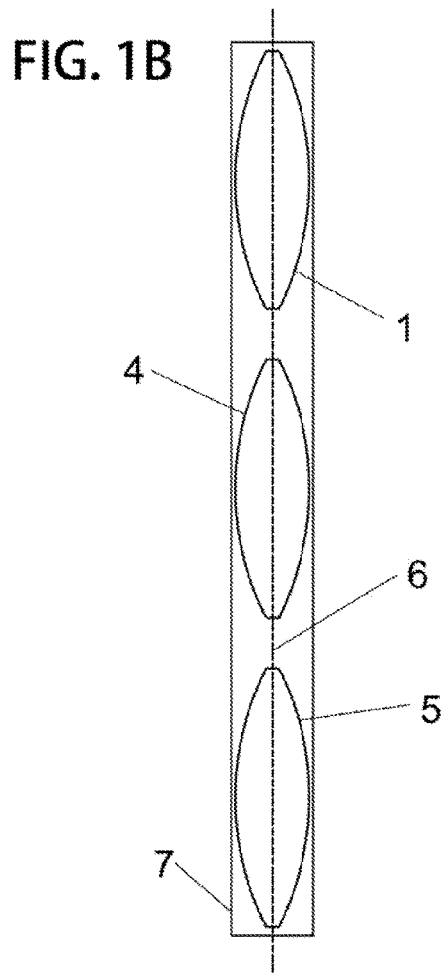

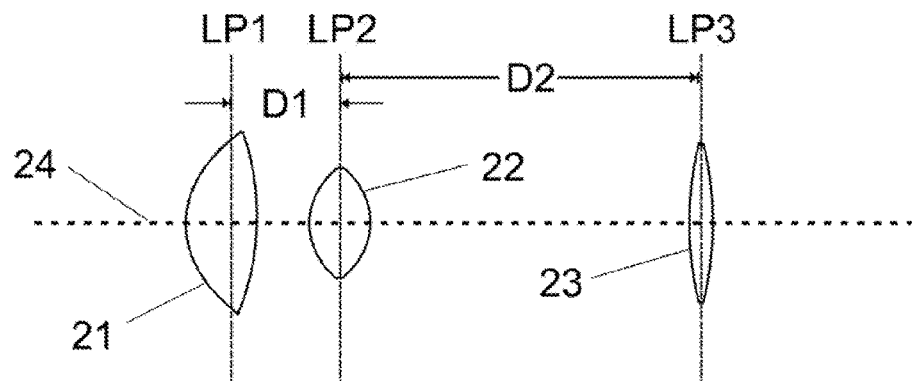
FIG. 2A
FIG. 2B
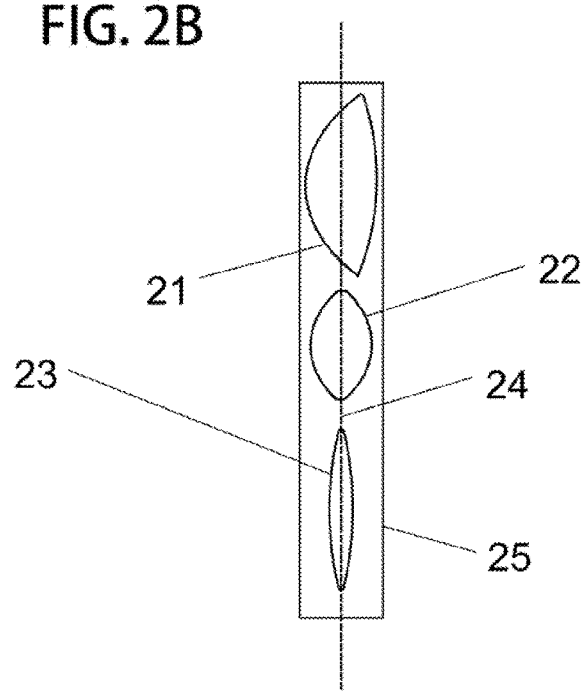

ns systems having particularly compact storage modes. It is a contrast to prior art methods and devices that systems first presented here do not rely upon commonly known telescoping compact fixed optical systems, but rather mechanically folding or collapsing optical arrangements. A fundamental difference between imaging systems of the instant inventions and those of the art can be found when considering their dual mechanical mode lens arrangements which permit an extremely thin profile storage mode and a very high resolution imaging mode with mechanical translation between these modes. Further, these imaging modes are enhanced by application of special algorithmic correction schemes unique to a particular lens configurations.

OPTICAL IMAGING SYSTEMS WITH ALGORITHMIC ABERRATION CORRECTIONS

BACKGROUND OF THE INVENTION

Continuing Information

This patent application stands on its own as an original, new and initial application for patent without continuation dependence from any other earlier filed applications.

Field

The following invention disclosure is generally concerned with optical imaging sciences and specifically concerned with optical imaging systems having translation functionality and cooperative algorithmic correction of imaging errors.

Related Systems

Since the very early 70s and slightly before, the Polaroid camera company and Edwin Land were busy bringing remarkable new portable cameras to the public. In particular, the famous and quite advanced SX70 compact instant camera is an icon in the eyes of many enthusiasts of camera and photography history. The Polaroid SX70 had a very remarkable feature in that a complex mechanical system permitted translation between two states including one state suitable for imaging and a second state suitable for storage and portability. A lens holder of a mechanical translation mechanism caused a lens to be moved from a storage position into an imaging position. While the lens would not be perfectly seated with respect to alignment in its imaging position after every cycle, it was a fairly precise mechanical system that resulted in quite good imaging quality. Of course the SX70 of the early 1970s was not the first 'folding camera'—it was nevertheless a benchmark from which all comparisons could be drawn and an excellent representative of the early art. One can gain an appreciably good understanding of how a portable camera having a storage mode and an imaging mode and a mechanical translation system operable for switching between these modes may be realized in consideration of U.S. Pat. No. 3,714,879 by Inventor Land and others.

'Camera slimming' is a term sometimes used in the imaging arts to refer to reducing the size of a camera system but more particularly the lens portion of a camera apparatus. The nature of high quality optical imaging devices tends to dictate that an optical axis of appreciable length accommodate thereon a plurality of individual optical elements or so called 'thin lenses'. However, this often necessitates heavy and bulky glass systems which are at least inconvenient (e.g. in DSLR devices) and prohibitive for lightweight computing platforms such as smartphones and aerial photography done by drone type flying video systems for example. Accordingly, there is a significant movement towards special optical imaging configurations which permit very lightweight and less bulky systems which still have excellent imaging performance.

In one exotic example, the 'Oragami Lens' or folding lens is reported in good detail by researchers at UCSD in La Jolla, Calif. and others. A folded lens may be in-part based upon foundational principles suggested long ago (about 1670) as a 'Cassegrain telescope' configuration. By diamond turning a single calcium fluoride disk, multiple reflecting surfaces sufficient for high resolution imaging have been achieved in a 'folded lens' arrangement. Because the device is very thin and lightweight, it may be ideal for applications where high image quality is desired in very lightweight and compact (volume) devices. Smartphones are an important illustrative example because the space available in a smartphone is of a very significant premium—yet at the same time typical users of smartphones today demand very high quality images. The UCSD Origami folding lens may remain a viable candidate for such applications despite its complex manufacturing properties. These folding lenses might also address weight problems known in flying photography applications such as microdrone systems which appreciably suffer in flight time where every gram of extra load tends to degrade system capacity. However, such proposed lens system include complexities which render their practical use questionable. These sometimes have a very narrow field of view and quite limited depth of field. Presently, such origami type lenses are still laboratory curiosities more than commercially operative systems.

Compact camera manufactures have long devised systems in which a lens is collapsible along its optic axis in the sense that it retracts into the camera body to achieve a more compact profile. In the storage position, the lens no longer forms images at the sensor because the focal distance is not correct for the imaging condition. When imaging is required, the lens is extended away from the sensor until enough distance lies between its last lens element of a compound lens and the image plane where the electronic sensor is located. In this operational mode, an imaging mode, the camera may be used to make photographs. After photographs are made, the lens may be translated again to its storage configuration making the camera more compact and easy to carry in a small pocket for example. Because it is relatively easy to precisely control positioning in telescoping concentric cylinders, these lenses still have very good imaging quality.

While systems and inventions of the art are designed to achieve particular goals and objectives, some of those being no less than remarkable, these inventions of the art have nevertheless include limitations which prevent uses in new ways now possible. Inventions of the art are not used and cannot be used to realize advantages and objectives of the teachings presented herefollowing.

SUMMARY OF THE INVENTION

Comes now, Dmitry Valerievich Shmunk with inventions of optical systems including translatable lens arrangements and cooperative aberration correction schemes. It is a primary function of these devices and methods to provide very high performance imaging systems having particularly compact storage modes. It is a contrast to prior art methods and devices that systems first presented here do not rely upon commonly known telescoping compact fixed optical systems, but rather mechanically folding or collapsing optical arrangements. A fundamental difference between imaging systems of the instant inventions and those of the art can be found when considering their dual mechanical mode lens arrangements which permit an extremely thin profile storage mode and a very high resolution imaging mode with mechanical translation between these modes. Further, these imaging modes are enhanced by application of special algorithmic correction schemes unique to a particular lens configurations.

Compact high performance imaging systems include image processing means arranged to correct imaging errors intrinsic to the special nature of these lens arrangements. In particular, both the physical nature of the optical train and the expected mechanical variation of the translation system contribute to image error for any particular compound lens design. Mechanical translation between a storage mode and an imaging mode can impart predictable imaging aberrations which can be undone after image capture in the digital domain. Image plane processing—or processing in the electronic domain is achieved when pixel data captured from the physical optics is adjusted according to some algorithmic scheme.

When a system is in a storage mode, a set of lens elements may be laid in a very compact space i.e. substantially sharing a common planar volume to form such storage mode. A mechanical translation device operates to move and align these lens elements from their positions in the storage mode such that they are rearranged to lie on a common optic axis and realize an imaging mode whereby images are formed at an image plane containing a sensor device. Because mechanical imperfections may prevent exact lens element positioning and repeatability is not exact, imaging errors sometimes result. As these image errors which are due to imperfect lens placements are well understood, repeatable and predictable, an image processing filter particular to the precise nature of an optical design is devised and used to correct the image captured by the sensor in the electronic domain via computational image processing. Because these imaging systems are particularly useful in compact photography and videography applications such as in conjunction with smartphones and lightweight flying aircraft for example, these image processing schemes are further particularly tuned for moderate computer processing capacity. Unlike common iterative imaging processing techniques which have very high processing capacity and load demands, systems presented herein deploy a kind of single pass filter which is static in nature and does not overly rely upon availability of such high capacity computing resources. As such, the filter is readily applied at a high frame rates without requiring an accompanying supercomputer.

To arrive at a static filter of the nature described, the optical system is subject to processes which apply image correction and verify the result. After iteratively adjusting the filter to achieve a best result, the characteristic and nature of the filter is matched to the optical system and ready for use in photography of non-test images.

A physical optical system is designed as one or more compound lenses and this system is characterized for the intrinsic imaging attributes which are associated therewith. Both the refractive errors and mechanical imperfections of an associated translation system may be taken into account. Images of special purpose calibration targets may be formed by the lens for which a filter is being made. Feedback based upon schemes such as neural network results in improvement in further iterations. After sufficient process, the filter algorithms are finalized and 'locked-in'. The filter design is then set as specifically matched to the lens from which it was derived. Thereafter, the particular filter can be used in conjunction with imaging from that lens without requiring the neural network nor iterative manipulations. The filter may thereafter be applied to any images captured by the lens as most imaging errors specific to the lens are present in all images made by it without regard to the nature of the subject being imaged.

Objectives of the Invention

It is a primary object of the invention to provide new high performance imaging systems having extremely compact storage modes.

It is an object of the invention to provide imaging system arrangements with integrated mechanical translation means.

It is a further object to provide multi optical element lens systems having an error correction filter to restore image integrity.

It is an object of the invention to provide new compact imaging systems of extremely high imaging performance and resolution.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

Figure 4:
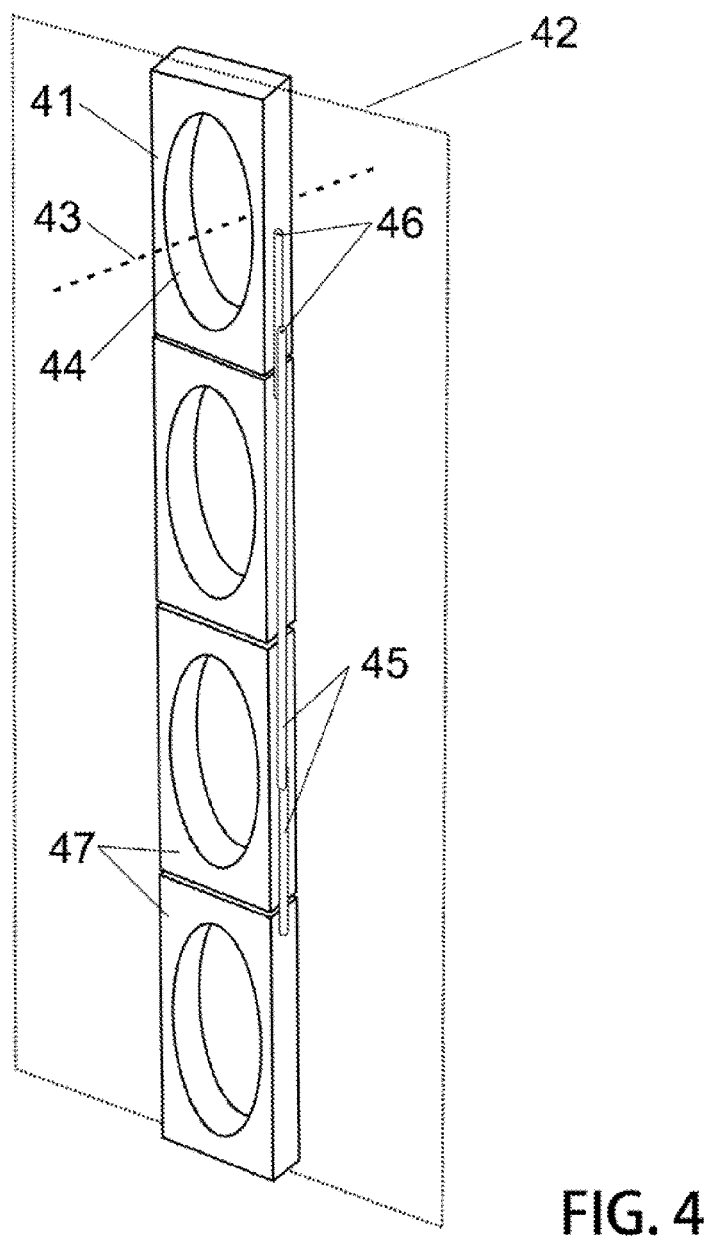
Figure 5:
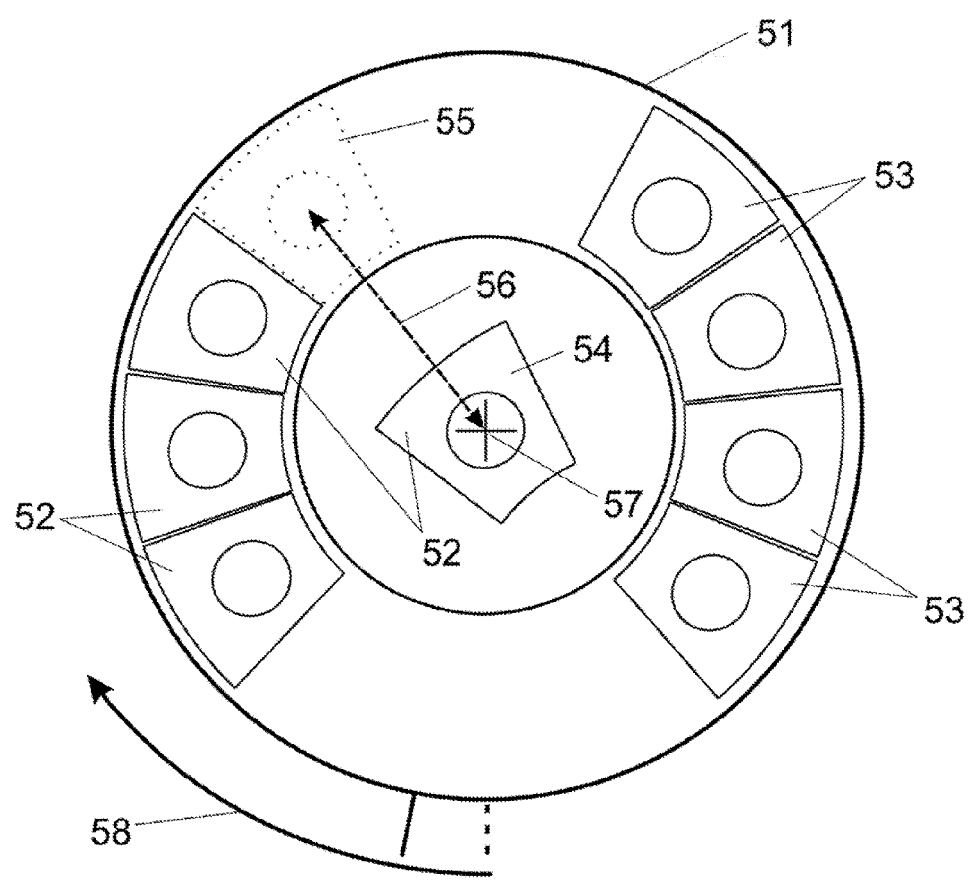
Figure 6:
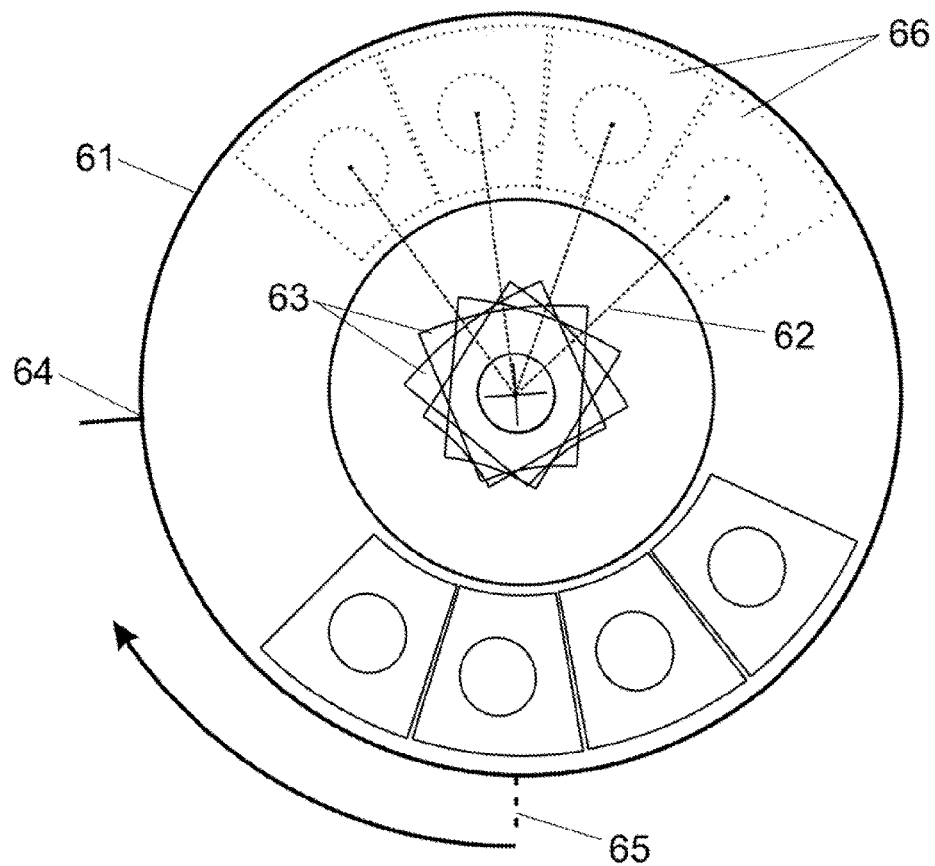
Figure 7:
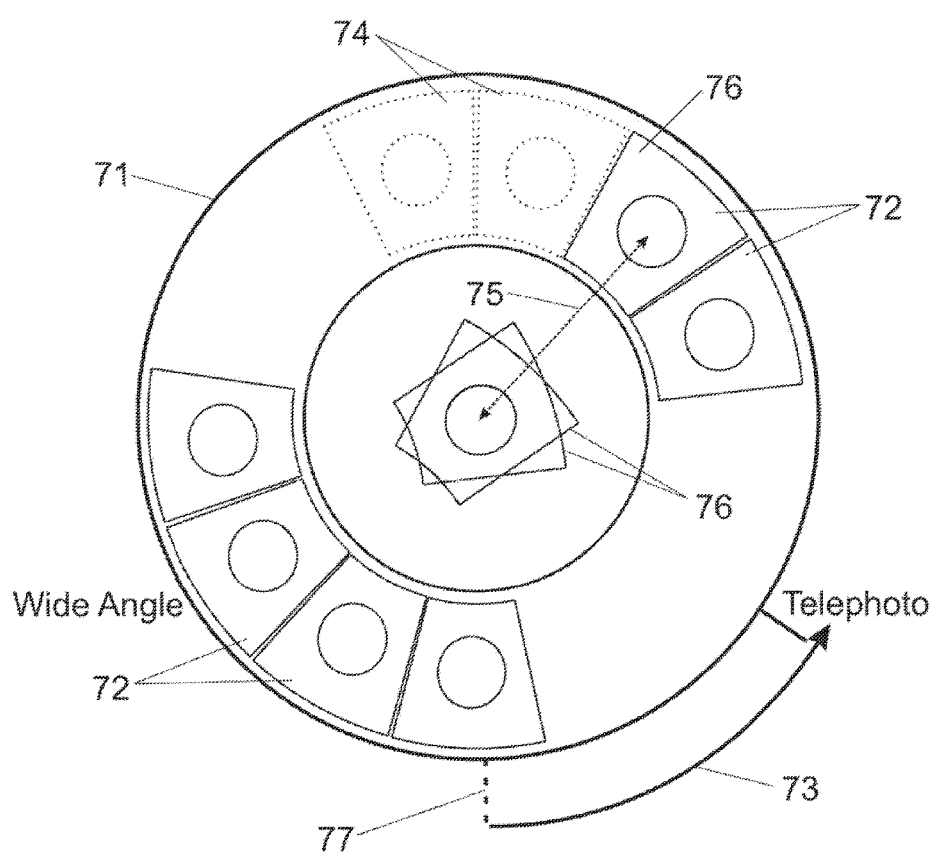
Figure 8:
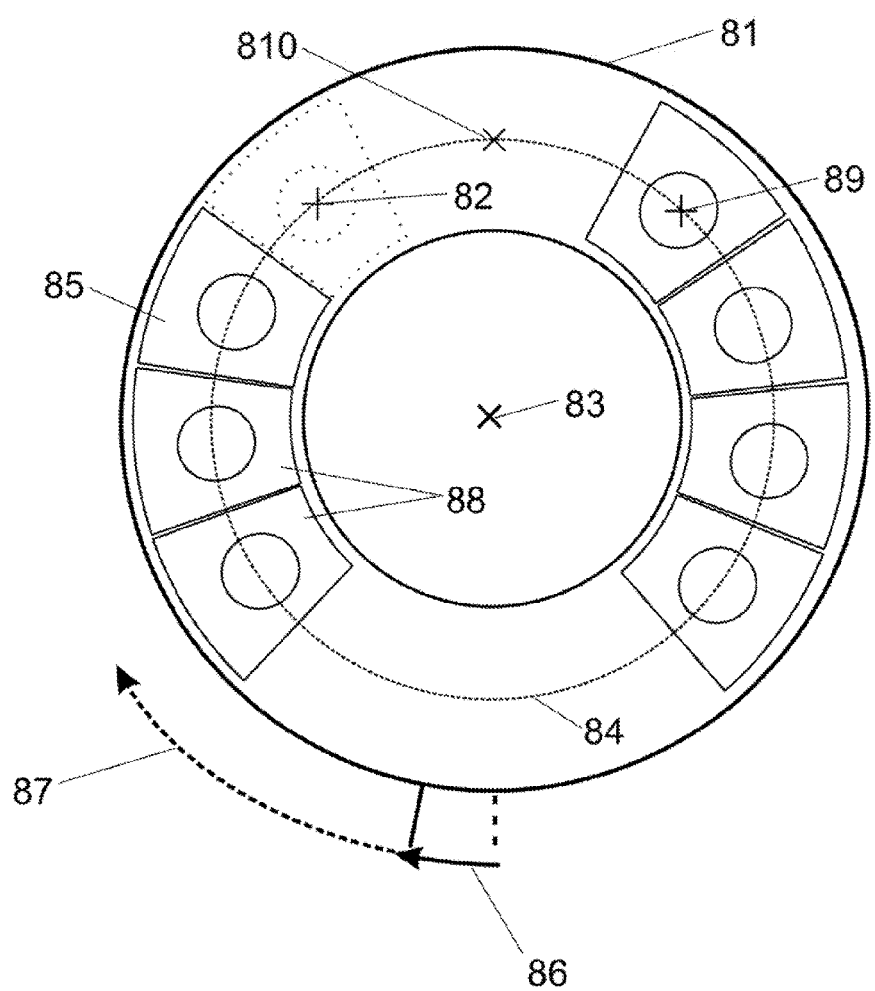
Figure 9:
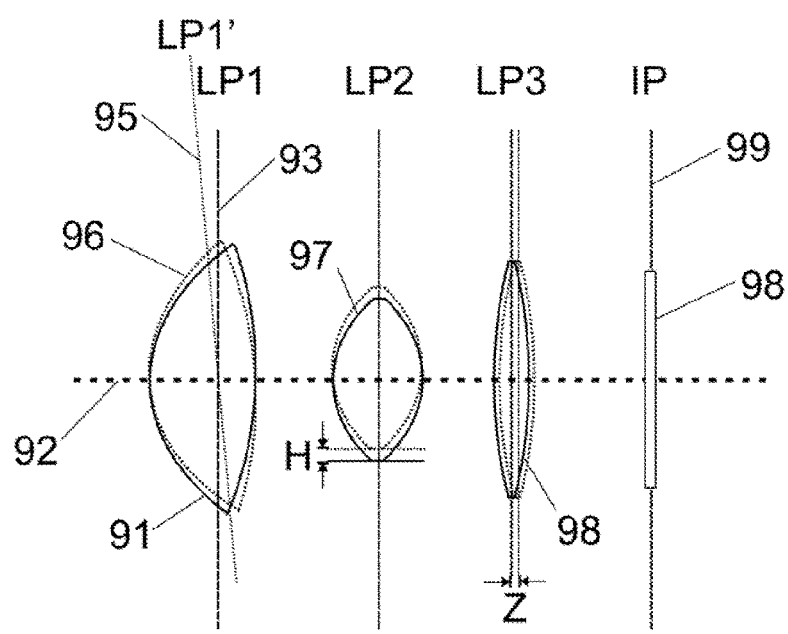
Figure 10:
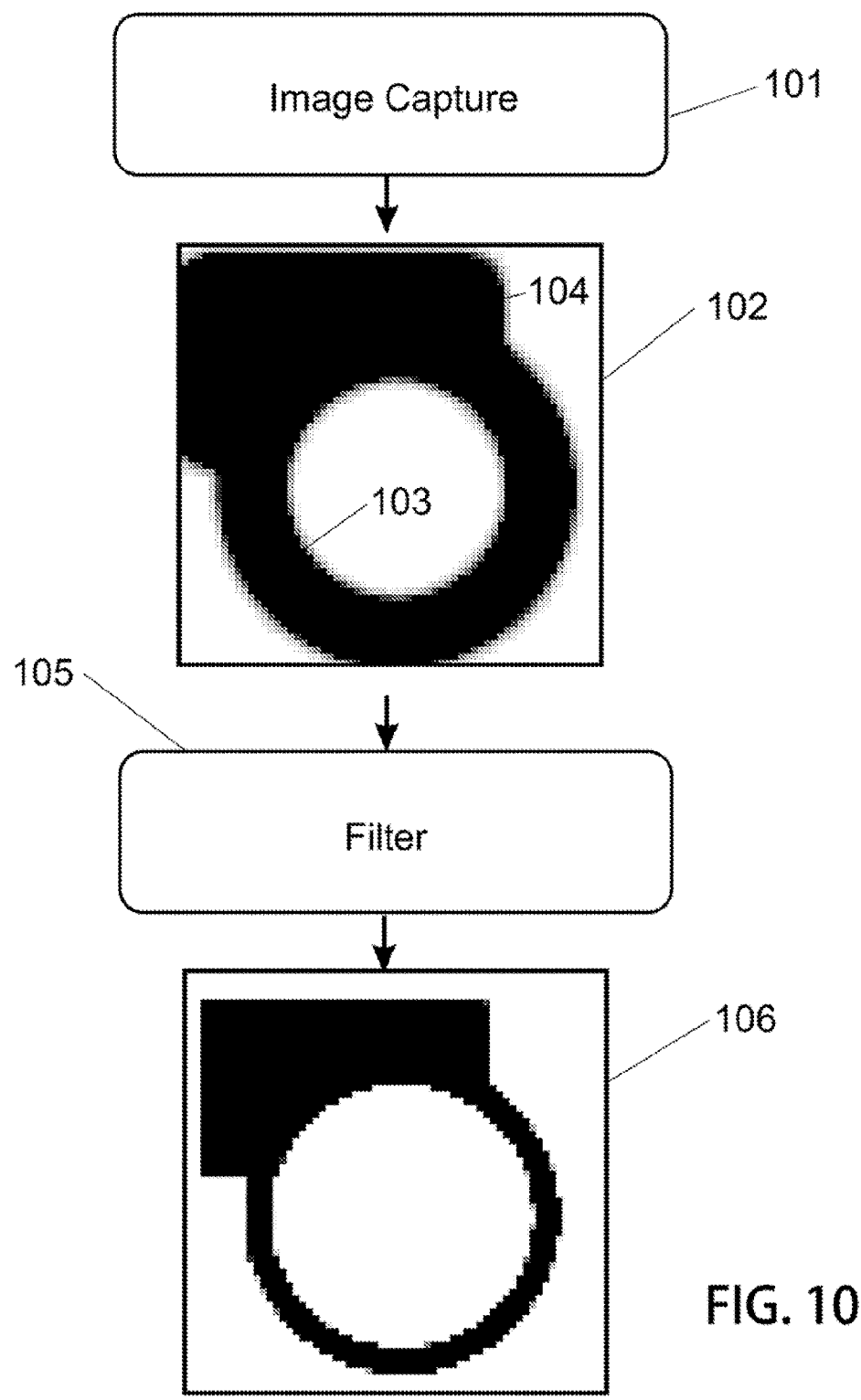
Figure 11:
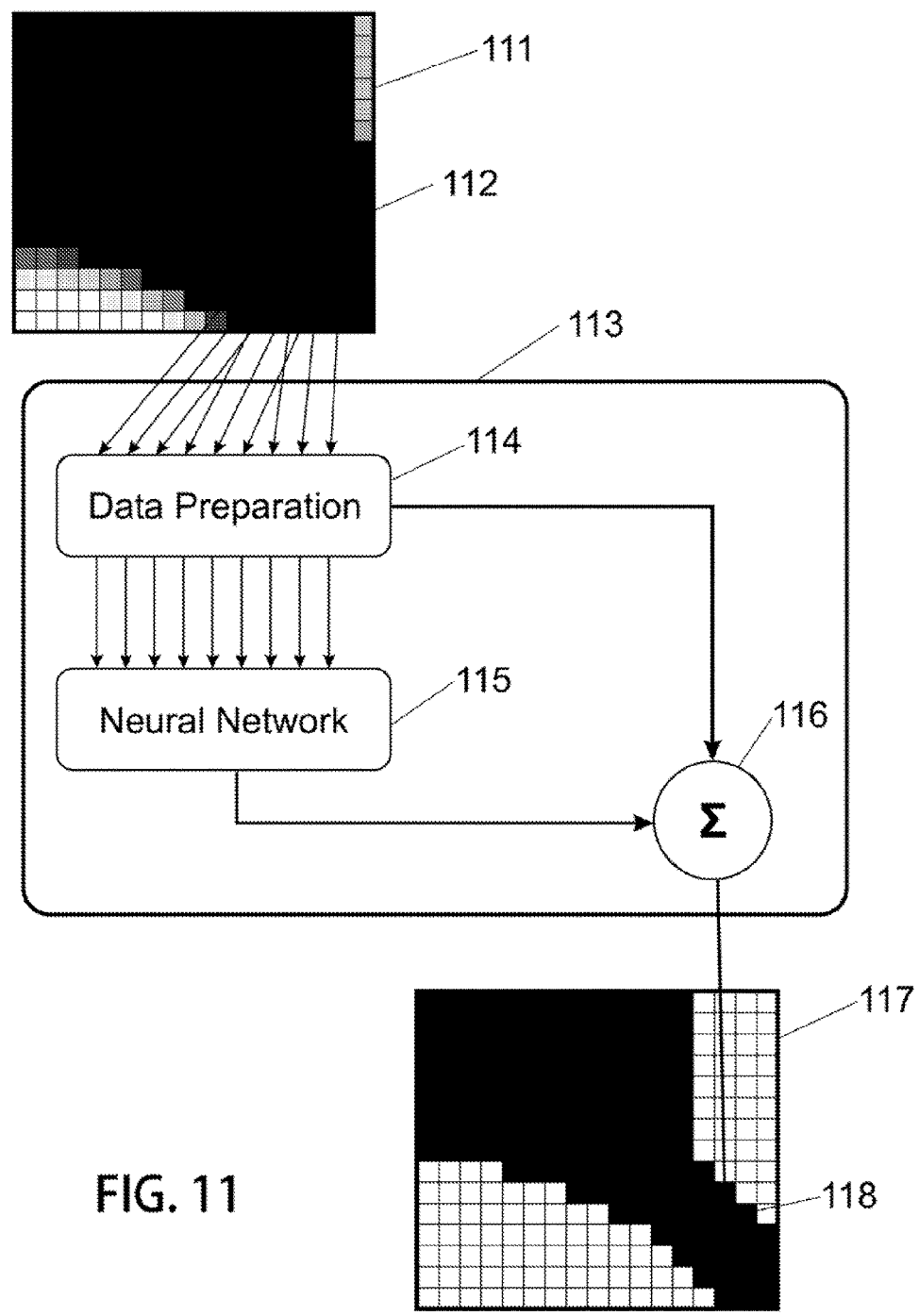
Figure 12:
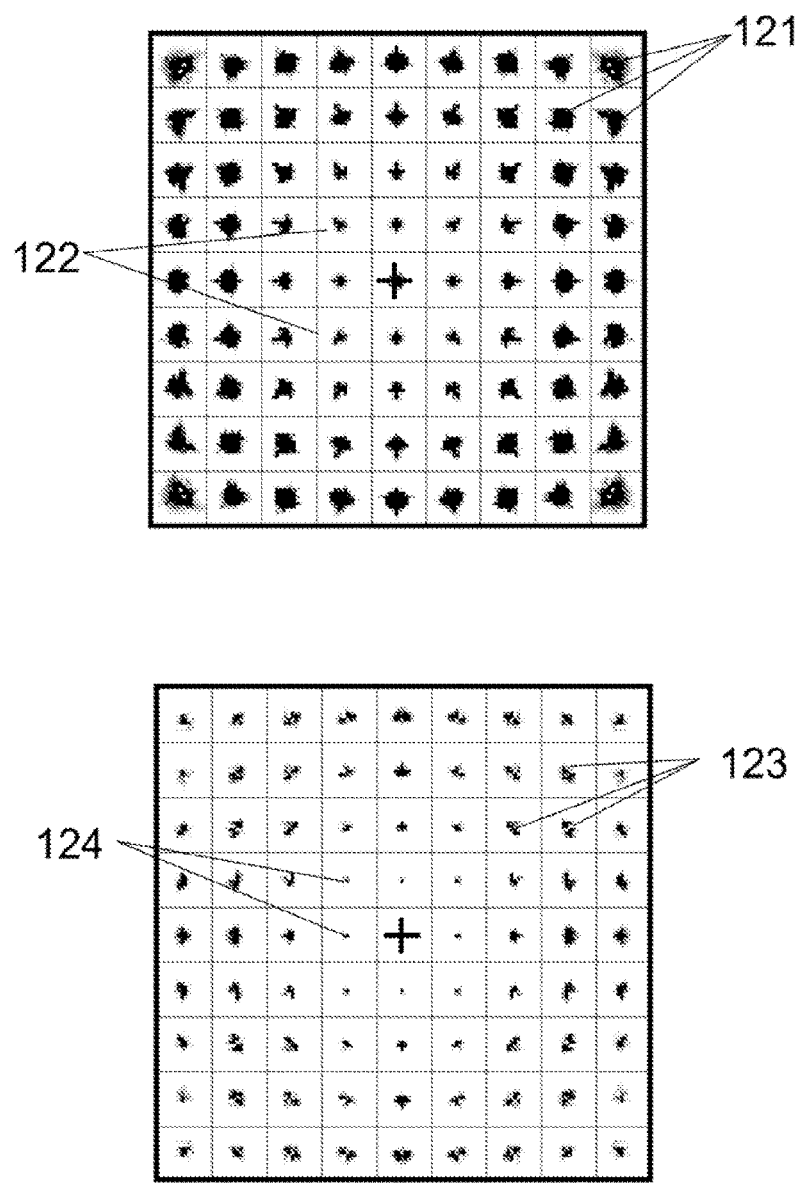
Figure 13:
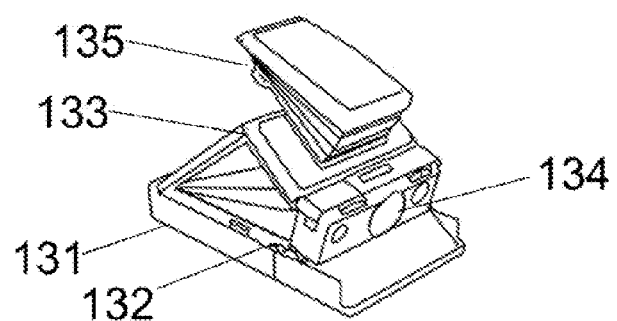
Figure 14:
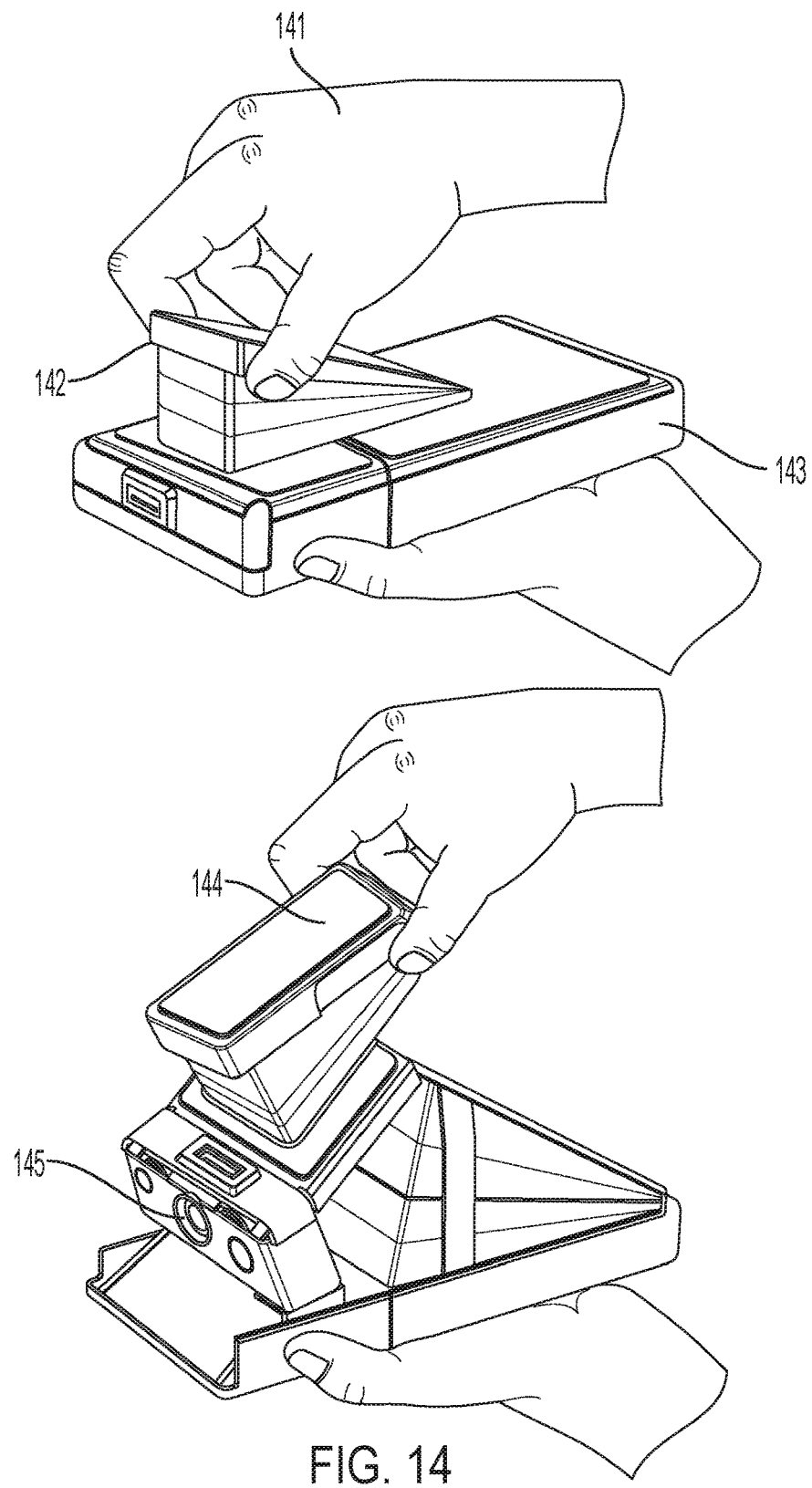

These and other features, aspects, and advantages of the present inventions will become better understood with regard to the following description, appended claims and drawings where:

FIGS. 1A and 1B are schematic diagrams showing important geometries of optical components in two arrangements;

FIGS. 2A and 2B similarly show optical components in two special geometric arrangements; and FIG. 3 is illustrates an example version of mechanical translation device which operates to move optical components between two important geometric arrangements;

FIG. 4 shows the mechanical translation device in a second displacement or position;

FIG. 5 presents an alternative version of translation device, a radially activated system having advanced features;

FIG. 6 illustrates an operational mode of such illustrative radial translation device;

FIG. 7 further illustrates mechanical translation action with respect to this radial translation system;

FIG. 8 illustrates a version in which the imaging axis is displace with respect to the mechanical rotational axis;

FIG. 9 describes certain various mechanical placement variations present in some mechanical translation systems which might affect imaging;

FIGS. 10 and 11 include images which illustrate application of a static filter of these systems;

FIG. 12 shows pixel errors having a radial dependence and a corrected image having taken that into account; and FIG. 13 and FIG. 14 show some important prior art devices having a mechanical translation system to move a lens between a storage and an imaging mode.

GLOSSARY OF SPECIAL TERMS

Throughout this disclosure, reference is made to some terms which may or may not be exactly defined in popular dictionaries as they are defined here. To provide a more precise disclosure, the following term definitions are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Mechanical Translation Device

A mechanical system which translates coupled objects from a first position and/or location to a second position and/or location via a continuous mechanical motion.

Optical Domain/Digital Domain

Image processing in an optical domain includes corrections applied to a propagating optical beam via refractive elements for example lenses and prisms. Image processing in an electronic domain includes image corrections applied to a post detector electronic signal via application of numeric adjustments to pixel data.

Planar Volume

While the common definition of a 'plane' is a geometric construct which necessitates an infinitely thin geometric element, for purposes of this disclosure a 'planar volume' is to be understood to have finite thickness but otherwise substantially planar and having a high aspect ratio in two dimensions orthogonal to thickness.

DETAILED DESCRIPTION AND PREFERRED EMBODIMENTS

In accordance with each of preferred embodiments of the invention, optical imaging systems having a mechanical translation system are provided. It will be appreciated that each of embodiments described include an apparatus and that the apparatus of one preferred embodiment may be different than the apparatus of another embodiment. Accordingly, limitations read in one example should not be carried forward and implicitly assumed to be part of any alternative example.

To achieve these high performance imaging systems having two modes including an imaging mode and a storage and portability mode, special designs are embraced. Specifically, imaging systems having a plurality of lens elements each held in a holder substrate include a mechanical translation system arranged to translate between these two modes. The mechanical translation system has mechanical positions corresponding to these modes and permits smooth continuous motion therebetween. In the storage mode, the lenses are held within a thin planar volume. In an imaging mode, the lenses are held on a common optic axis whereby an image is formed on an imaging detector.

A compound lens is preferred for improved optical performance. A compound lens is comprised of two or more singlet lenses arranged on a common imaging axis. All lens, singlets and compound lenses tend to have imaging errors including diffractive errors and refractive errors. In addition, some compound lens systems are subject to errors due to imperfect placements and alignments of singlet lenses from which they are comprised. All of these errors are embodied as blurring of images in the image place and they may be characterized by a 'point spread function'.

The point spread function may be different for every distinct optical and mechanical set-up. A point spread function may be characterized and measured for any particular optical system and is sometimes used to express the optical performance of lenses. In most typical image systems, a point spread function tends to have radial dependence whereby pixels which lie furthest from an imaging axis have a greater degree of blurring or 'point spread'.

In some advanced image processing strategies, correction made be done after an image is captured by an electronic sensor. In particular, some very advanced image processing schemes call for iterative processing of image data in the digital domain to reduce the result of point spread having occurred in the optical domain. While these image processing techniques sometime produce excellent results, in particular where they are responsive to the nature (e.g. spatial frequency content) of various images captured, they do nevertheless require very comprehensive processing power and a sufficient amount of time to apply these computationally intensive processes.

Systems disclosed herein include those systems which are constrained by processing power. A such, image processing filters which require computationally intensive support are excluded. Rather, systems described herein suggest use of special filters which are built in view of a matched optical system, where those filters may be characterized as single pass, static filters having very low computational requirements. A filter of these systems is configured and designed in view of a test optical system and image. Once tuned, the filter parameters are frozen of locked-in and do not change further. Filters are not later adjusted in response to detection nor analysis of the content of an image being captured—and as such they are static once tuned. The static filter is thereafter used for all images capture thereafter its instantiation.

Since it is a major objective of these systems to provide high performance imagers including a mechanical system which enables a very compact storage mode as well as an imaging mode, these systems are provided with a special filter specifically tuned for the optical system which performs image error corrections to effect high resolution images. These filters may be characterized as single pass, static filters which operate in the digital domain and have very low computational demands in their operational states.

Particularly, a compound lens comprising several singlet lens elements which may be high performance aspherical lenses either molded or ground materials of high index of refraction operate together in a prescribed physical arrangement to focus onto an image plane detector an image field. Several lenses which share a common optical axis may be used to form high resolution images on a charged coupled device of array of pixels where light is converted into electronic signals.

When not being used for making images, it is advantageous to translate the lens system into a storage mode whereby the lenses do not consume as much space. A mechanical system of lens holder substrates 'folds' or otherwise collapses to cause the independent lenses to distribute into a thin space where they may be held in a manner which does not overly consume space but does not permit imaging. In preferred versions, a tactilely driven mechanical system permits a user to apply slight pressure from a finger for example to drive the mechanical system between it modes including imaging mode and storage mode.

In one version, a linear system of mechanical translation is formed with a plurality of lens holder substrates each are linked to at least one other by pivots and connecting levers. When translated to a first terminal position, the device causes all lenses to lie on a common axis and form an arrangement whereby they operate together to form a single image on an image plane. When this translation system is manipulated to move to its other terminal position, the lenses are disengaged from the imaging axis and are moved to fall into a single thin planar space having very low volume. It may be said the optical system is 'folded' away for storage. The lenses may be kept in this configuration until the next time when they are needed for imaging when they may be returned to their imaging mode.

In a second version, a radial system is arranged with a distribution of lens holder elements held in an annular apparatus for storage. When the annular ring is turned it causes the lens singlets to be assembled together in a stack having a single imaging axis whereby the lenses operate together for form images at an image detector. Rotation in the opposite sense returns the lenses to their storage positions in the annulus and maintains a flat or low volume planar space suitable for compact storage.

Thus, apparatus include a plurality of lenses and lens holder substrates. These are translated between two geometries. In a first, they occupy the space of a thin planar volume. In a second, they stack together on a common axis to form an imaging arrangement. A better understanding may be realized in view of the following descriptions with references to the appended drawings.

Lens System Geometries

FIG. 1 sets forth some important nomenclature of these collapsible compound lens systems first taught herein this invention disclosure. In particular, FIG. 1A illustrates three discrete lens elements which are disposed upon a common optic axes in an alignment which supports imaging. A first lens element 1 has an optic axes and a symmetry axis 2. This lens element may be characterized as a 'thin lens' element having two curved lensing services. A lens element may be formed of dense optical materials such as glass or hard plastics or other materials having high index of refraction compared to air and are suitable for passing light therethrough.

A lens plane also designated in the diagram as LP1 or 'lens plane 1"' is a plane 3 in which the lens element substantially lies. Of course, due to the finite thickness of a lens it is only an approximation to say the lens lies in a plane but the terminology of the lens plane in this manner is well understood and conventional in optical sciences.

A second lens element 4 lies a distance D1 from the first lens element and a third lens element 5 similarly lies a distance D2 from the second lens element. Each lens element has an optic axes and each optic axes is collinear with the others. The second lens plane, LP2 and a third lens plane LP3 correspond respectively to those lens elements and those elements are said to substantially lie in those planes. When a plurality of lens elements are positioned as shown with a common optic axes, they can operate to cooperatively form an image thus, herein this disclosure such arrangement is sometimes referred to as 'imaging arrangement' or 'imaging mode'.

In another important geometry of lens elements arrangements, a plurality of lens elements are disposed such that each lens element's lens plane lies substantially within a common plane or is coplanar. FIG. 1B illustrates one important arrangement of lens elements 1, 4, and 5 each lying in a common lens plane 6. This arrangement is a non-imaging arrangement as the lenses do not cooperate to form any image in this arrangement. However, an important and useful physical structure is nevertheless realized by this arrangement. The volume of space 7 occupied by a plurality of lenses arranged as shown can be very thin and more particularly only as thin as thickest lens element. In some important physical systems which use imaging lenses, space may be a premium commodity and lenses arranged in an imaging configuration tend to impart a thickness which is prohibitively costly in some systems. When a system can be arranged such that a plurality of lens elements can be translated between an imaging configuration and a storage configuration, then it is advantageous to arrange lens elements into a very thin volume or a common plane arrangement as shown in FIG. 1B.

While a very firm appreciation for these two important geometries is easily realized in consideration of the simplest diagrams of FIG. 1, real imaging systems do not typically look precisely like the diagram. Nevertheless, the very important concept of establishing two discrete arrangements of lens elements whereby one arrangement supports an imaging mode and another arrangement supports a storage mode is quite important and carefully illustrated in the diagram.

In more realistic imaging systems a plurality of lens elements which form a compound lens typically do not have identical curved spherical surfaces nor even spacings between elements as shown. But rather lens elements may have diverse aspherical curved surfaces and may be located on an optic axes with variable distances between each lens element. FIG. 2A illustrates lens element 21, lens element 22, and lens element 23 each with a different cross-sectional profile as may more typically be found in a compound imaging system. In an imaging arrangement, each of these lens elements preferably lies on a common axis which is the optic axes for each. FIG. 2A illustrates an imaging mode in which the lenses operate in cooperation with the others to form an image in an image plane in which a detector may be located. FIG. 2B illustrates a second mode which is to be considered a low-volume storage mode.

While these two modes are geometrically distinct and cannot exist simultaneously, it is possible to arrange for mechanical systems which provide a translation motion with respect to these two modes whereby an small applied force can cause the system to be switched between these modes whereby the arranged goes from a storage mode to and imaging mode and/or from an imaging mode to a storage mode in a smooth continuous motion.

FIG. 2B shows lens elements in a storage mode (non-imaging) whereby they have been displaced from their common axes and moved into positions where they share a common plane 24. In this mode the three lens elements lie within a thin planar space or volume 25 having a thickness that is not thinner than the thickest lens. In this configuration, the three lens elements occupy a space which is comparatively very thin in view of the arrangement associated with an imaging mode.

Now that the two important arrangements of lenses have been fully described and the nomenclature set forth, the description immediately following is provided to explain about translation between these two arrangements or modes.

With a full understanding of the two lens element arrangements or modes described and illustrated in FIGS. 1 and 2, it is now important to describe mechanical translation devices which operate to move a plurality of lens elements between these two configurations in a smooth natural motion while accomplished mechanical engineers will surely be able to devise many clever alternatives as an infinite number of possibilities exists, it is not a matter of importance to catalog those possibilities here. Rather two most important example versions are presented to give clear and full disclosure, the reader will appreciate the essence of the invention lies in the nature of system geometry between these two terminal positions of a mechanical translation system rather than any distinct mechanical device which can achieve the identical result.

Mechanical Translation System

Mechanical translation systems may be provided to hold a collection of lens elements in the two arrangements described. Further, the mechanical translation system is also arranged to permit smooth and easy translation from either mode to the other. These mechanical translation devices thus have two terminal positions and a smooth motion which causes lens elements to be arranged in a first operational or imaging mode and to be switched to a second storage mode.

The mechanical translation apparatus includes a plurality of lens element holders into which a lens element may be mechanically affixed or otherwise coupled and held therein. These lens element holders may move independently of others and are preferably mechanically coupled to via a common system whereby they each are switched between two positions including a position associated with an imaging mode whereby a plurality of lens elements each share a common optic axes and a storage mode whereby a plurality of lens elements each share a common plane.

There are many alternative versions of mechanical systems which operate to accomplish this task of mechanical translation between two lens arrangements or modes. Some are based upon folding substrates mechanically linked by pivots and connecting arms at a substrate lens element holder.

A first lens element may be separated from a second lens element by a distance D1 that is appreciably different than the distance D2 between the second and third lens elements. Each of the lens plane LP1, LP2, and LP3 are parallel and orthogonal to the common optic axes but not coplanar. This forms an imaging mode and light passing through these three lens elements can be focused to an image at an image plane.

These systems include mechanical means or apparatus which operate to cause a group of lens elements to be switched between these two operational modes. Some include slotted arrangements whereby an annulus is rotated about an axis to drive lens holders between desired positions. And still further some are advanced versions which support a multiplicity of compound lenses to achieve a telephoto/wide-angle selectable system.

In view of the fact that a great many mechanical systems can be arranged to achieve the same result and same purpose, it is not practical nor useful to describe all of these possibilities herein. Instead two most important examples will be presented with the understanding that clever engineers will design others to bring about the identical purpose without deviation from the spirit of the invention. Where a plurality of lens elements are mechanically switched from having a common optic axes in an imaging mode to sharing the thin volume of a planar region in a storage mode, the invention is fully accomplished.

FIGS. 3 and 4 present a mechanical translation system which is operable for locating a plurality of lens elements into distinct geometries including a first whereby each lens element shares an optic axes with each other and a second whereby each lens element lies substantially in a plane with each other to realize a lensing or imaging mode and a second mode operable as a storage mode. Further, the device illustrated provides for a smooth translation between these two terminal positions of a motion range.

This example mechanical translation system is illustrated in a first terminal position in FIG. 3 where a plurality of lens holder substrates are stacked together to form an imaging mode. A top lens holder substrate 31 having therein a receiving space 32 into which an optical lens element may be accommodated. Several similar lens element holding devices 33 may together form a stack whereby the axis 34 defines a system axis that lies symmetrically at the center. A links 35 and pivots 36 system may be affixed at the holder peripheral edges to impart a mechanical motion between each element whereby a smooth translation is effected such that the geometric relationship between holders and any lens elements held therein may be manipulated or switched from a first mode to a second mode. Specifically a mechanical translation system may include two (or more) terminal positions and a smooth motion therebetween causes the holder substrates to arrange in a different geometry with respect to the relationship with other holder substrates.

In particular, it is said that these mechanical translation devices have at least two terminal positions where one terminal position is characterized as having all lens elements share a common optic axes and a second terminal position is characterized as having all lens elements lie in a common plane.

FIG. 4 illustrates the same mechanical system of FIG. 3 but in a second geometry where translation to a second terminal position results in the holder substrates 41 all lying in a common planar volume 42. The optic axes 43 is no longer shared by all of the holder substrates and necessarily any lens elements mounted in the receiving spaces 44 which similarly loses the relationship with the optic axes. Links 45 and pivots 46 permit special prescribed relative motion between elements whereby they will actually become aligned with the storage plane 42. The storage geometry is characterized as a thin planar volume having finite thickness about the same magnitude as the thickest lens.

While it is considered a most important and primary version of these systems, the linearly collapsible mechanical translator of FIGS. 3 and 4 is not the only way to realize benefits of storing lens elements in a planar volume for conservation of space. Indeed another geometry permits two geometric arrangements including one characterized as a storage mode and another characterized as an imaging mode. This alternative version is based upon radial geometry whereby switching between terminal positions is done by a rotation of an annular ring about an axis whereby rotation drives a plurality of lens element holding substrates radially inward to align on a common optic axis. These radially driven systems may be considered advanced versions as they may be devised to simultaneously support more than one compound lens system in a single device.

FIGS. 5-7 illustrate a preferred version of these mechanical translation devices based upon a radially driven system and in particular, FIG. 5 shows an annulus or ring element which is rotatably movable about its center in a clockwise and/or counterclockwise sense. Lens element holders 52 including four pieces disposed on the left side and four additional independent pieces 53 disposed on the opposite side. By applying a rotational force to the annulus, the lens holder substrates are driven for example by way of a slotted groove and tab system, or other mechanical interlock drive system, toward the center of the device. Lens holder 54 is shown at the center as it has been driven from its original (storage) position 55 drawn in phantom along radial line 56 to cause a lens element therein to become positioned and aligned with its optic axis collinear with a system axis. As the annulus is rotated further, the other associated lens holder elements 52 are similarly driven radially along a mechanical guide mechanism to the center whereby their optic axes lie collinear with the others and the system axis to form a stacked arrangement of lens elements one on top of the others.

FIG. 6 illustrates that after 90 degrees of rotation of the annulus 61, four elements have been driven radially inward 62 to form a compound lens as each lens holder substrate is stacked 63 and lies in a manner to cause lens elements held therein to operate in an imaging mode.

Reference line 64 has been rotated from its origin 65 for example by light tactile force which may easily be applied to the annulus by an operator's finger(s) for example. Once lens elements are configured as shown, the imaging system operates to form images at a sensor which may similarly lie on the optic axis. The device is said to be in an operational mode characterized as an imaging mode.

The device may be returned to a storage mode merely by rotating the annulus in the opposite direction (i.e. counter-clockwise) 90 degrees to its original position. Rotation in the opposite direction has the effect of causing the lens element holder substrates to withdraw from their position at the device axis and back to their respective positions at the periphery of the system where they may all lie in a common plane in the areas shown by the dotted line 66.

Because space about the annulus is plentiful, and advanced version of these systems may be realized when two portions of the annulus are allocated to two independent compound lens systems. That is, a first set of lens elements forms one type of compound lens and a second set of lens elements forms a second type of compound lens. Users of these imaging systems for photography applications sometimes appreciate being able to choose between a telephoto lens and a narrow or wide angle lens having a wide field-of-view. Having the choice of lenses is an advanced feature supported by some versions of these systems.

In one example, an annulus is configured with a plurality of lens elements which support a telephoto lens function and a second plurality of lens elements which support a wide angle compound lens system. A user may choose and then engage either of these merely by rotating the annulus in a corresponding prescribed direction. For example a clockwise rotation from an initial position may cause a prescribed set of lens elements associated with a wide-angle lens to be driven radially toward a system optic axes while a counter-clockwise rotation from the same initial position may cause a different set of lens elements to be assembled together on a common axes to form a telephoto lens.

FIG. 7 illustrates a selectable lens feature where a mechanical translation device has three terminal positions each associated with either of the following lens operational modes: wide-angle; storage; telephoto.

An annular ring 71 is arranged as a rotatable device which accommodates therein a plurality of lens element holding substrates 72 in two groups of four elements each. From a storage position the ring may be rotated about its axis in a fashion which causes a drive system to move lens element holder substrates into the center and still further axially (or into the page of the drawing).

Lens elements from a single group stack together on a common axis to form a compound lens. The lens element holder substrates may additionally include mechanical means for spacing and indexing whereby once stacked on a system axis the lens elements held therein are well aligned with respect to the other. A telephoto lens is achieved when two or more singlets (four in this example) are stacked as shown. When the annulus is returned to its original position, the lens holder elements are withdrawn from the stack one after another and returned to their storage position within the annulus in a common plane.

When the annulus is rotated from its initial position, the mechanical drive system causes the set of lens holders to assemble at the system optic axis thus enabling the telephoto mode to become operable whereby images are formed at a sensor. By rotating 73 the ring counterclockwise by a prescribed amount e.g. ninety degrees, lens holding substrates 74 are driven axially 75 to a position one on top of another 76 whereby each lens falls onto a system axis which is collinear with each lens' optic axes at the center of the annulus to achieve this telephoto mode.

When the operator is finished with telephoto photography, the set of lens singlets may be returned to their storage positions in the annulus by a rotation of the annulus in the opposite direction. When the annulus returns to its initial position 77 all lens holder substrates return to a position in the annulus characterized as all lying in a single plane.

To enable wide angle imaging, an alternative set of lens elements may be similarly driven to the system center to form an alternative compound lens. The annulus may be rotated in a clockwise sense and that motion causes the mechanical system to shift lens holder substrate associated with a wide-angle lens toward the system center.

The mechanical systems described herein are intentionally left without precise engineering details. Competent engineers will readily devise many clever ways to realize the same result. The present invention is not to be considered directed to any particular mechanical translation mechanisms, but rather of systems which operate to assemble lens element arrangements from preferred geometries having operational advantages (i.e. imaging) to other preferred geometries having different advantages associated therewith (i.e. storage). Two important innovative examples setting forth preferred important geometries have been described in detail.

Optical lens systems having a retractable nature are not new. The art is busy with wonderful arrangements which afford adequate imaging performance with good storage configurations. Precise mechanical designs permit translations of the lens element components of the compound lens imaging system albeit necessarily introducing some error and aberration due to mechanical misalignment partly due to cycle variance or hysteresis. Each time the system is translated between its two (or more) modes the elements are located in slightly different positions. Mechanical hysteresis tends to prevent perfect positioning performance for those compound lenses with integrated translation means.

These are special alternative versions which may simplify the mechanical means by which lens holders move to cause lens elements to stack on top of each other. While versions presented in FIG. 5-7 move lens elements into the center of the annulus, it is also possible to use the turning motion of the annular ring 81 shown in FIG. 8 to cause individual lens holder substrates to stack one on top of the other on a common axis 82 which is displaced with respect to the system center and turning axis 83 of the annular ring. It is convenient to select a point which lies on circle 84 common to each of the lens centers. When the annular ring is rotated, it carries lenses along the circle periphery to the location of the axis 82. When a lens holder substrate 85 arrives at the preselected axis 82 location, the holder may be driven or pushed into the page via a mechanical system whereby it becomes stacked on top of a previous lens similarly located in an earlier portion of the rotation throw 86. Continued rotation 87 further drives the lens elements 88 remaining in the annular plane to arrive at the common axis and be stacked upon all others there.

An alternative compound lens is similarly realized via a rotation in the opposite sense. In such case, the lens holder substrates may stack at a second displaced axis 89. This arrangement may be preferable in versions where more than one type of image sensor is desired. Since the two axes are displaced with respect to the system center and further with respect to each other, the arrangement made better support systems having two independent image sensors. Where it is preferable to use but a single sensor at a common imaging axis 810, the sensor being operable for both lens groups may be arranged to receive singlet lenses from both directions of rotation of the annulus which contains two groups of lens singlets held in holder substrates.

FIG. 9 illustrates. When a plurality of lens elements lies in a common optic axis 91 they may operate in conjunction with each other to form an image at image plane 92.

Various misalignments of optical elements tend to degrade the quality of images. Images are converted to electronic signals at a sensor such as a CCD. Because a CCD (and other types of sensors) are typically comprised of a discrete number of picture elements or pixels arranged in an array, image quality sometimes depends upon the lens elements ability to correctly focus light into these pixels or imaging bins without imaging errors which can cause light to 'spillover' into adjacent pixels causing image degradation.

Lens element misalignments result in imaging errors and aberrations and these misalignments come from several sources. Due to imperfections of a mechanical translation device a lens element 91 may not successfully be positioned precisely on the compound lens system axis or system optic axis 92. A lens plane 93 is supposed to be orthogonal to the optic axis but may instead be slightly displaced and askew with respect thereto in lens plane LP1' 95. The lens element drawn in phantom 96 is not precisely aligned and as such will cause specific imaging errors at the image sensor. Mechanical translation systems proposed here are sometimes visited by lens positioning errors such as that shown as lens 91. The resulting distortion at the image plane is well understood and predictable. Thus, with good knowledge of the precise nature of and extent of these mechanical misalignments, filters can be designed to specifically correct these errors.

Lateral displacements of optical elements may also occur in compound lens systems having integrated translation means. Lens element 97 may not exactly align collinear with the system axis despite having an optic axis which is parallel and near thereto. After a translation motion of mechanical system, a lens element may be slightly displaced a distance 'H' away from its ideal position. This displacement also causes a well-known and predictable imaging error at the image plane, an error which may be reversed by a certain image processing techniques specifically designed to reverse or undo the point spread function associated with such lens element misalignments.

Because of the nature of the mechanical systems described, the direction of such lateral misalignments can be well predicted and repeatable. For example, in the direction tangent to the annulus rotation, lens singlets may have a higher degree of this type of misalignment. Accordingly, filters specifically designed in view of mechanical nature of the systems can operate to undo such errors having this type of directional bias. Thus filters proposed here may be particularly arranged and matched to the mechanical nature as well as optical performance of the optical system. So long as these lens element misalignments and their associated imaging errors are well known, mathematical algorithms can be particularly devised to address such errors. Lens element 98 may lie perfectly aligned and collinear with the system axis but nevertheless slightly displaced along the axis by an amount "Z". This type of lens element placement error also introduces focus aberrations with regard to particular imaging systems and the true nature of those aberrations are well known and understood in a way that image correction is mathematically possible by applying an image processing filter that has been designed with particularly regard to the physical nature of these lens elements and placement uncertainties they are likely to suffer in view of the intrinsic nature of the mechanical translation system.

Filters

Cameras first disclosed here include unique image error correcting filter systems. A filter of these cameras is implemented in the digital domain rather than optical. While optical systems of the arts have corrector plates and other optical correction devices, the type of filter described here cannot be implemented as a refractive device. Rather, it is in-part a computational system which operates on pixelized data captured at an image sensor. Image errors which arise in the optical domain can nevertheless be 'un-mapped', reduced or otherwise removed. In particular, errors due to refractive imperfection, diffraction limitations, and even focus errors can be operated upon to improve final images.

Because a compound lens of these systems may include 2, 3 or even 4 or more singlet lenses, and these lenses are fixed in their mechanical nature (i.e. their curved refractive surfaces and positioning in an optical train), some errors produced by them can be quantified with excellent precision in view of an a priori knowledge of the imaging errors intrinsic to them. This type of imaging error does not change over time. Error due to lens design remains the same over the lifetime of the camera. Because this type of error is easy to quantify once the precise nature of a mechanical system is characterized and defined, a filter can be constructed in view of these errors and to account for them and be made to operable to neutralize them.

An category of error which cannot be known so precisely relates to imperfect placement of lenses as illustrated in FIG. 9. When a mechanical system is used to locate and position the singlets of a compound lens, it is impossible to achieve perfect mechanical repeatability from cycle to cycle. As such, imaging errors may result. However, the degree and manner in which such errors might degrade images is largely predictable. While successive system displacement cycles will have some variance with regard to lens element position, a filter design presented herein may nevertheless be prepared to account for predictable ranges of variance. Thus these address error correction for imaging systems of the type described herein throughout.

Collapsible compound lens systems have been attempted previously on many occasions—the art is replete with various forms of collapsible lenses for conservation of space in a storage mode. However, successful systems have been greatly restricted due to some important mechanical constraints. In general mechanical systems which impart a collapsible feature with regard to compound imaging systems tend to be limited to compressions in the axial direction—or a telescoping collapsing action. This is largely due to the fact that it is exceedingly difficult to achieve sufficiently good alignment precision in non-axially collapsible systems. High-quality imaging systems based upon a compound lens require very precise alignment of individual lens elements to maintain good image resolution sufficient for modern photography. For this reason, most mechanical translation arrangements rendered are not suitable for high quality imagers.

It has been heretofore impossible to realize very high quality images when using mechanical systems which necessarily have significant mechanical play or variance. The mechanical translation systems described herein suffer from this problem as well. Due to imperfect placement of lens elements, images which form on image sensors include aberrations and errors which significantly reduce image quality. However, these errors are very certain, repeatable and predictable in most cases. For that reason, it is possible to 'unmap' most of these errors and to mathematically correct for them by applying a pixel-by-pixel correction algorithm in the electronic domain. A nonlinear filter can be devised with a particular view to the precise nature of the lens elements and the lens element configurations whereby the filter operates to greatly improve the image quality.

It is important to note that these filters are distinct from similar image correction strategies deployed by experts in the imaging arts. Typically, image correction algorithms and strategy are independent of particular lens element configurations. While some excellent depth-of-focus tricks have been devised by the engineers of the Lytro® camera, those tricks are for the most part not dependent upon the particular individual lenses from which a compound lens is comprised. Rather, these 'refocusing' tricks work on images without regard to the precise nature of the compound lens construction. Additionally, depth-of-field focus errors are significantly different than the types of image errors introduced by poorly placed lens elements of a compound lens.

In contrast, a special purpose filter designed as an error correction means specifically designed with respect to the nature and configuration of the lens elements for which a compound system is comprised, and further for the expected lens element positioning errors, is first suggested here.

Image correction filters used in previously known systems generally adopt an iterative strategy based upon a "cost function" whereby an image is manipulated, measured, and manipulated again where the following operation depends upon the measurement to create a feedback loop. While excellent results have been achieved with such approaches, these systems are limited to specific applications because they are quite demanding of processor resources and are therefore not appropriate in systems where processor capacity is limited. They are not suitable for applications where limited computing power and limited processing times are among the system constraints. Conversely, the filters designed for use in conjunction with these collapsible lens systems are not based upon such feedback loop but rather a single pass operation which can be very quickly completed with modest processing power. For this reason, these systems are ideal for common photography applications which often are accompanied by very modest computing resources and sometimes high frame rates.

It is important to note that the filters proposed herein are specifically designed for the optical train plan. The static single pass filter for one optical train may be different than a preferred filter for a different compound lens optical design. In the special high-performance optical systems illustrated in FIGS. 5-7 where two discrete compound lenses are supported, it is preferred that each lens has its own filter. Accordingly, some versions of these systems include a plurality of filters one each for each discrete compound lens system.

A filter of these systems is characterized as an algorithmic manipulation of images whereby pixel data is adjusted in view of geometric errors introduced by physical optics system. After an optical system characterization is made, a filter is designed to 'undo' geometric imaging errors by changing pixel data to counteract known error. For example, the point spread function.

Digital Domain

An image is formed by a compound lens as described herein at an electronic image sensor, the image sensor being comprised of a 2-D array of picture elements or 'pixels'. An electronic signal is formed which represents the 2-D image field and spatial intensity distribution. Because of image errors, pixel values may be influenced by neighboring pixels. Light which should arrive in one pixel instead arrives in a neighboring pixel. Where this is mathematically predictable, it may be undone by adjustments to pixel values in the digital domain.

FIG. 10 illustrates. An image capture system 101 such as a compound lens formed from a plurality of singlet lens elements operates on input light fields refractively to form an image in a plane containing an electronic image detector comprising a two-dimensional array of picture elements 102. Each pixel has a discrete value representing a grayscale intensity. When viewed together, the pixels form a slightly blurred image of a circle or ring 103 superimposed on a dark rectangle 104.

An electronic signal which represents pixel values may be sent as input to a filter device and system 105 which may be embodied in either hardware or software as a computational module. In particular, pixel values are adjusted in view of algorithms which may be dependent in-part upon the pixel values of neighboring pixels. 'Neighboring' pixels include both adjacent pixels and pixels which are merely near but not touching a pixel subject to the application of correction. When proper adjustments to pixel intensities are applied sequentially to all pixels, the image in 106 is sharper or more in focus because the representation of the circle and rectangle have crisper edges which were lost to imperfect refractive and pixilated capture systems. Thus these crisper edges are recovered in the digital domain due to careful application of edge enhancing techniques, spatial filtering methods, and other applications of spatially related manipulation of pixel data.

A more detailed view will be appreciated in view of FIG. 11 which shows an intersection area between the circle and rectangle in a close-up view.

An image field 111 of pixel elements includes a group 112 of nine adjacent pixels, the intensity of each may be considered when determining an adjustment to the value of the pixel at the center of the group. Each of eight pixels which surround the center pixel are herein called 'neighbors'.

A nonlinear filter may be applied to each pixel of the image data in a sequential operation. Neighboring pixel data may be used as inputs and a pixel-by-pixel determination of correction or adjustment is made. The filter may additionally include as input overall pixel coordinates, lens positions and orientations displacement values, system asymmetries such as known predispositions for lens displacement errors along a particular direction, image capture system temperature, and other parameters affecting presence, form and extent of error or aberration in image data.

A nonlinear filter with optimal parameters is designed for particular optical arrangements (including various compound lens arrangements) and further in consideration of image sensor parameters such as pixel pitch and sensor size. Or even a plurality of discrete filters one each tuned specifically for a section (pan) of image formed by the lens. Thus, a filter designed for one optical arrangement may not operate as effectively on an alternative optical system. Where cameras of the systems include a plurality of compound lenses, so too may they include a plurality of discrete filters one each tuned specifically for each compound lens.

These filters may be designed in a special iterative processes where a trial and error learning with feedback are used in conjunction with special test targets until a satisfactory result is achieved. Thereafter, the filter is set and matched with its optical system and these operate cooperatively, the filter remaining in a static mode, for all images thereafter made with the lens arrangement for which it is matched. Thus an algorithm is 'tuned' until good performance is achieved and then locked to form a static filter for use later when imagining with the prescribed optics from which the filter was derived.

For example, a neural network may operate to adjust an algorithm's parameters until excellent imaging is detected via feedback mechanisms. Thereafter, that so tuned filter can be expected to have good correction performance in conjunction with imaging with the particular optical system to which it is matched. In one preferred version, a nonlinear, multilayer perceptron system is used to configure a filter algorithm when exposed to a particular imaging configuration and high-performance test target. It has been empirically determined that one of the optimal architectures of the network for the assigned task is cascade forward perceptron with two hidden layers and sigmoidal or tangential functions of activation in all layers.

A complete nonlinear filter includes:
pre-modification of digitalized pixel values from image data (separation of the low frequency portion of the spatial content of the image);
processing the inputs with the previously trained neural network;
reverse normalization;
a further summation of the output of the neural network with low-frequency data, obtained during the step of data pre-modification.

Image data pre-modification includes the following steps:
Spatial filtering: low spatial frequencies are separated from high frequency components. Such spatial filtering may be performed with the use of the common linear filter (for example, computing the averaged value for all the pixels within a radius of 8 pixels in respect to the given one). Low frequencies separation allows for reduction of a dynamic range of input data.
Selection of the pixel values neighboring to the pixel being processed.
Subtraction of the value of low-frequency component from all the neighboring pixels.
Normalization. The neural network works in most favorable mode if the dynamic range of input values is not wide, and normalization allows to additionally reduce the dynamic range. All the pixels arrays are normalized in a way that pixels values would get into the particular range (for example, [0 . . . 1]).

This modified data is transferred to the input of the neural network. Data modification is used both during pre-training of the neural network, and, while using the neural network as part of the nonlinear filter.

Description of Neural Network Pre-Training

Pre-modified (as described above) and normalized pixels of the reference image captured through the optical system for which filter is designed are used as target data during network pre-training.

A Levenberg-Markqardt algorithm, which gives the best results for neural networks of medium and small sizes, is used for neural network training.

After output of the neural network is received, reverse normalization is performed thereon. For example, if during pre-modification step the normalization was done by simple multiplication to a constant, the reverse normalization is done by dividing the data received from the output of the neural network by the same constant.

Thus, data processing by means of the nonlinear filter includes:
pre-modification of image data;
data processing by pre-trained neural network;
reverse to modification of neural network output; and
adding the low-frequency data obtained during pre-modification of image data to the result of the reverse to modification step.

FIG. 12 shows an important aspect of imaging errors common to simple lens systems. Each singlet may contribute in its own way to distortion which is a function of radial distance from the image plane center. In a most simple form, one type of this distortion is sometimes called 'pincushion' and 'barrel' distortion. The distortion is primarily due to a mathematical approximation where $\theta=\sin \theta$. For small $\theta$, the error is small. Where $\theta$ becomes appreciably different than 0, the error increases. Other types of aberrations can also contribute to the imaging errors: spherical aberrations, chromatic aberrations, astigmatism, coma, and higher order aberrations and distortions. Accordingly, pixels at the periphery 121 of the sensor tend to have a greater error as illustrated in the diagram. Pixels 122 near the imaging axis tend to have a small point spread.

After an appropriate filter is applied to the pixel data, even the pixels far from the system axis 123 have a good focus while pixels 124 at the center remain in focus.

In a brief reference back to the prior an, the SX70 Land camera 131 which is illustrated in FIGS. 13 and 14 show that from early days of camera design, there was appreciable motivation to have a mechanical means 132 to achieve a folding 133 lens 134 system which included a storage mode and an imaging mode. The storage mode, a lens was moved to occupy the space in a thin plane. In the imaging mode, the device consumed considerably greater volume necessary for the lens system to properly form images. However, these cameras did not include digital filters which could correct for expected shortcomings due to mechanical imperfections in the folding systems. Rather, they relied on the notion that the degree to which such systems were able to product focused images, such images were acceptable. For high resolution images, it was impossible to use a folding means to realize space savings in a storage mode.

Nevertheless, the 'Land' camera as it was affectionately called was adored by its users. A light pull from a user's hand 141 on the viewfinder optics 142 raised the folding system. A second pull 143 on another portion of the viewfinder caused the lens 144 to be raised into its imaging position.

Unfortunately for the Land camera, digital electronics required to produce filters specific to the optics used were not available until quite recently. It has just recently become possible to arrange for a static filter which cooperates with a particular optical train to effect excellent image correction without overly burdensome processing power requirements.

One will now fully appreciate how advanced high performance imaging systems having very compact storage modes may be realized. Although the present invention has been described in considerable detail with clear and concise language and with reference to certain preferred versions thereof including best modes anticipated by the inventors, other versions are possible. Therefore, the spirit and scope of the inventions should not be limited by the description of preferred versions contained therein, but rather by claims appended hereto.

It is claimed:

1. Optical imaging systems comprising:
a plurality of lens elements;
a plurality of lens holder substrates;
a mechanical rotation system;
at least one imaging detector; and
said optical imaging systems having a storage mode and at least one imaging mode, the mechanical rotation system having mechanical positions corresponding to the storage mode and the at least one imaging mode and being rotatable therebetween,
each of said plurality of thin lens elements being affixed in said lens holder substrates,
wherein said storage mode comprises a mode in which the plurality of lenses are held in a common planar volume,
wherein said imaging modes comprises modes in which the plurality of lenses are held on a common optic axis whereby—an image is formed on said at least one imaging detector; and
wherein said mechanical rotation system comprises a radial system whereby rotational motion about a system axis causes lenses to be driven to and from an annulus to an imaging axis.

2. Optical imaging systems of claim 1, wherein said mechanical rotation system is further comprises a linear arrangement of mechanically coupled lens holder substrates rotatable between the imaging mode and the storage mode along a linear throw between two terminal positions.

3. Optical imaging systems of claim 2, each of said lens holder substrates are coupled to at least one other lens holder substrate via pivots and connecting levers to effect a structure which lies substantially in a planar volume in a storage mode and forms a stacked arrangement along a common axis in an imaging mode.

4. Optical imaging systems of claim 3, wherein said mechanical system further comprises ergonomic means operable for being tactilely driven by an operator's finger or fingers.

5. Optical imaging systems of claim 1, said mechanical rotation system further comprises:
an annular ring rotatably disposed about an axis;
a mechanical drive system arranged to move said plurality of lens holder substrates from positions within the annular ring to a stacked formation having a common axis whereby an image is formed on said imaging detector.

6. Optical imaging systems of claim 5, wherein said common axis is collinear with said rotation axis.

7. Optical imaging systems of claim 5, wherein said common axis is displaced with respect to said rotation axis and lies on a circle which defines the path of travel of said plurality of lens' centers when said annular ring is rotated.

8. Optical imaging systems of claim 1, wherein said optical imaging system is further comprised of a plurality of compound lens groups, each compound lens group having a plurality of lens holder substrates and corresponding lens singlets.

9. Optical imaging systems of claim 8, wherein a first compound lens of the plurality of the compound lens groups comprises a telephoto lens high magnification and narrow field of view and a second compound lens of the plurality of the compound lens groups comprises a wide angle lens having low magnification and wide field of view.

10. Optical imaging systems of claim 1, further comprising at least one image processing filter arranged as a computing platform operable for receiving pixel data inputs, applying a correction function thereon, and providing pixel data outputs.

11. Optical imaging systems of claim 10, said image processing filter is characterized as a static single pass filter.

12. Optical imaging systems of claim 10, said filter is optimized for a particular optical system whereby its parameters particularly operate on errors produced by the compound lens to which it is coupled.

13. Optical imaging systems of claim 12, said filter is further characterized as a non-linear filter.

14. Optical imaging systems of claim 10, said filter is further characterized as a system which applies: a premodification of digitalized pixel values from image input data separating a low frequency component thereof; processing inputs with a pretrained neural network; reverse normalization; summation of the neural network output with low frequency image components obtained in the premodification step.

15. Optical imaging systems of claim 14, said image data premodification is further characterized as comprising:
low frequency separation;
Selection of neighboring pixel values;
Subtraction of low frequency component from neighboring pixels; and
normalization.

16. Optical imaging systems of claim 15, further comprising transferring so-modified data to the neural network input.

* * * * *